United States Patent
Lee (10) Patent No.: US 9,929,449 B2
(45) Date of Patent: Mar. 27, 2018

(54) SYSTEMS AND METHODS FOR WARMING BATTERIES

(71) Applicant: Emerson Network Power, Energy Systems, North America, Inc., Warrenville, IL (US)

(72) Inventor: Julie JoAnn Lee, Huron, OH (US)

(73) Assignee: VERTIV ENERGY SYSTEMS, INC., Lombard, IL (US)

( * ) Notice: Subject to any disclaimer, the term of this patent is extended or adjusted under 35 U.S.C. 154(b) by 333 days.

(21) Appl. No.: 14/733,737

(22) Filed: Jun. 8, 2015

(65) Prior Publication Data

US 2015/0357686 A1     Dec. 10, 2015

Related U.S. Application Data

(60) Provisional application No. 62/010,311, filed on Jun. 10, 2014.

(51) Int. Cl.
*H01M 10/615* (2014.01)
*H02J 7/00* (2006.01)
(Continued)

(52) U.S. Cl.
CPC ....... *H01M 10/615* (2015.04); *H01M 10/637* (2015.04); *H02J 7/007* (2013.01);
(Continued)

(58) Field of Classification Search
CPC ............. H01M 10/615; H01M 10/627; H01M 10/637; H01M 6/5038; H02J 7/0068;
(Continued)

(56) References Cited

U.S. PATENT DOCUMENTS

| 5,703,471 A | 12/1997 | Bullock et al. |
| 5,828,203 A | 10/1998 | Lindeboom et al. |

(Continued)

FOREIGN PATENT DOCUMENTS

| CN | 202423513 | 9/2012 |
| JP | 2012-69280 | 4/2012 |

(Continued)

OTHER PUBLICATIONS

Ji, Yan, and Chao Yang Wang. "Heating strategies for Li-ion batteries operated from subzero temperatures." Electrochimica Acta 107 (2013): 664-674.*

(Continued)

*Primary Examiner* — Ryan Johnson
(74) *Attorney, Agent, or Firm* — Harness, Dickey & Pierce, P.L.C.

(57) ABSTRACT

Systems and methods for warming batteries are generally disclosed. According to one aspect, a system for warming a battery includes one or more rectifiers each having an input for receiving an input voltage and an output configured to provide an output voltage to a load. The system also includes at least one battery having an input for receiving an input voltage to charge the battery. The battery is coupled to the load and configured to provide an output voltage to the load. The system also includes a controller coupled to the battery and configured to raise the output voltage of the battery above the output voltage of the one or more rectifiers so that current flows from the battery, thereby warming the battery.

20 Claims, 4 Drawing Sheets

(51) Int. Cl.
*H02J 9/06* (2006.01)
*H01M 10/637* (2014.01)
*H01M 10/627* (2014.01)
*H01M 6/50* (2006.01)

(52) U.S. Cl.
CPC ............ *H02J 7/0068* (2013.01); *H02J 9/061* (2013.01); *H01M 6/5038* (2013.01); *H01M 10/627* (2015.04); *Y10T 307/344* (2015.04); *Y10T 307/352* (2015.04)

(58) Field of Classification Search
CPC .......... H02J 7/007; H02J 7/0091; H02J 7/047; H02J 9/06; H02J 9/061; Y10T 307/344; Y10T 307/352
See application file for complete search history.

(56) References Cited

U.S. PATENT DOCUMENTS

| | | | |
|---|---|---|---|
| 6,002,240 | A | 12/1999 | McMahan et al. |
| 6,577,103 | B2 | 6/2003 | Tanaka et al. |
| 6,753,651 | B1 | 6/2004 | Goral |
| 7,737,655 | B1 | 6/2010 | Devaney et al. |
| 8,400,101 | B2 | 3/2013 | Yoshida et al. |
| 8,692,506 | B2 | 4/2014 | Saito et al. |
| 8,859,157 | B2 | 10/2014 | Manabe et al. |
| 9,209,637 | B2 * | 12/2015 | Monden ................ H02J 7/0054 |
| 2011/0288704 | A1 | 11/2011 | Schwarz et al. |
| 2011/0298427 | A1 | 12/2011 | Uemura et al. |
| 2012/0235481 | A1 | 9/2012 | Nakashima et al. |
| 2016/0318418 | A1 * | 11/2016 | Tokushige ............. H02J 7/007 |

FOREIGN PATENT DOCUMENTS

| | | |
|---|---|---|
| JP | 2012-257394 | 12/2012 |
| JP | 2014-11832 | 1/2014 |
| KR | 1317270 | 10/2013 |
| WO | 2007/072781 | 6/2007 |

OTHER PUBLICATIONS

Vlahinos et al., Energy Efficient Battery Heating in Cold Climates, National Renewable Energy Laboratory, http://www.ctts.nrel.govBTM/, (2002), 8 pages.

* cited by examiner

SYSTEMS AND METHODS FOR WARMING BATTERIES

CROSS-REFERENCE TO RELATED APPLICATION

This application claims the benefit of U.S. Provisional Patent Application No. 62/010,311 filed Jun. 10, 2014. The entire disclosure of the above application is incorporated herein by reference.

FIELD

The present disclosure relates to systems and methods for warming batteries.

BACKGROUND

This section provides background information related to the present disclosure which is not necessarily prior art.

Electronic equipment cabinets may be used to enclose electronic components and protect the electronic components from water, dirt, other contaminants, etc. The cabinets may typically include frames, panels, doors, etc. to enclose the electronic components, and may be shaped, sized, etc. to accommodate different sized electronic components, different numbers of electronic components, etc.

SUMMARY

This section provides a general summary of the disclosure, and is not a comprehensive disclosure of its full scope or all of its features.

According to one aspect of the present disclosure, a system for warming a battery generally includes one or more rectifiers each having an input for receiving an input voltage and an output configured to provide an output voltage to a load. The system also includes at least one battery having an input for receiving an input voltage to charge the battery. The battery is coupled to the load and configured to provide an output voltage to the load. The system also includes a controller coupled to the battery and configured to raise the output voltage of the battery above the output voltage of the one or more rectifiers so that current flows from the battery, thereby warming the battery.

According to another aspect of the present disclosure, a method of warming a battery in a power system is disclosed. The system includes one or more rectifiers configured to provide an output voltage to a load. The battery is coupled to the load and configured to provide an output voltage to the load. The method includes determining a temperature of the battery and, when the temperature of the battery is below a minimum temperature threshold, raising the output voltage of the battery above the output voltage of the one or more rectifiers so that current flows from the battery, thereby warming the battery via an internal resistance of the battery.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
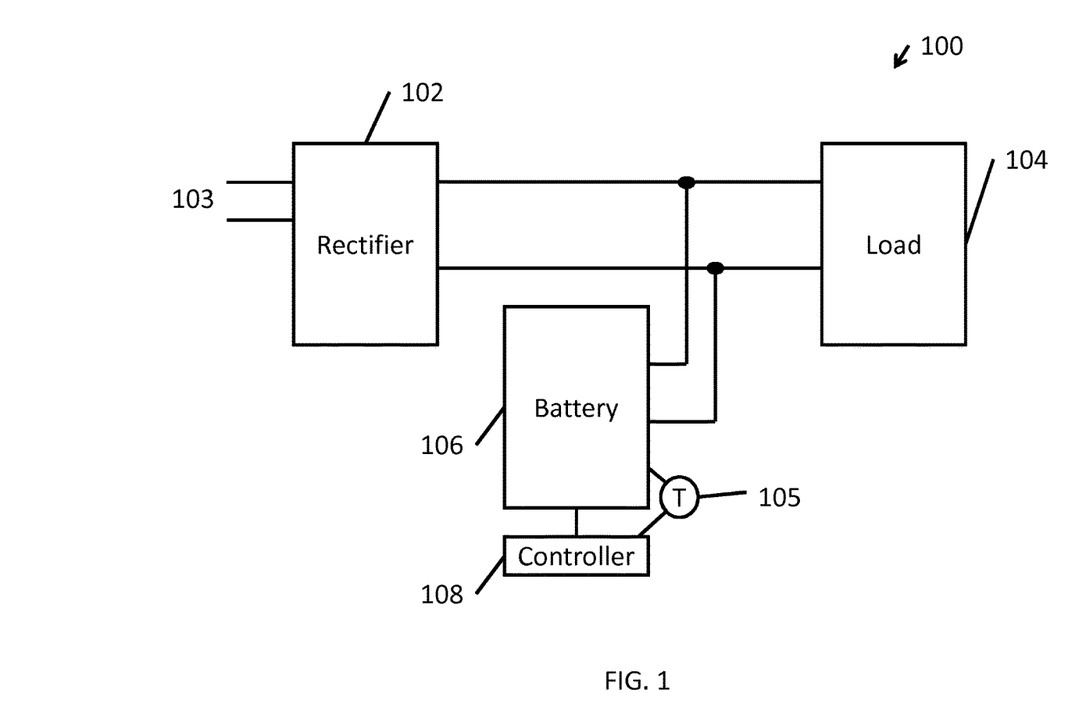
FIG. 1 is a block diagram of an example system for warming batteries, according to an aspect of the present disclosure.

A system for warming a battery according to one example embodiment of the present disclosure is illustrated in FIG. 1 and indicated generally by reference number 100. As shown in FIG. 1, the system 100 includes a rectifier 102 configured to provide an output voltage to a load 104, and a battery 106 coupled to the load and configured to provide an output voltage to the load. The system 100 also includes a controller 108 coupled to the battery 106 and configured to raise the output voltage of the battery above the output voltage of the rectifier 102 so that current flows from the battery, thereby warming the battery.

After a cold soak of the battery 106, a warm up period may be needed before the battery is capable of providing a specified amount of output power. The cold soak may broadly include any situation that causes the battery 106 to be exposed to temperatures below normal operating temperatures for the battery. As an example, if a heating system in a building housing the battery 106 fails, the battery temperature may be exposed to colder temperatures, thereby lowering the temperature of the battery.

Battery cells may need to have a temperature (e.g., an ambient temperature around the battery, an external temperature of the battery, an internal temperature of the battery, etc.) above a specified threshold (e.g., a minimum threshold, etc.) in order to provide a specified discharge. For example, in lithium based batteries, the cells need to be at or above a specified ambient temperature to facilitate movement of lithium through the cell. If the battery 106 cannot provide power at the moment an event occurs such that the rectifier 102 cannot provide the total power needed to the load 104, the battery may endure a load step from zero to as much as the full power rating of the load, which may cause transients in the system 100, provide less power, voltage, current, etc. than needed by the load, etc.

In some example embodiments, the system may be a power distribution system where the rectifier 102 is configured to provide power to the load 104. The rectifier 102 have an input 103 configured to receive alternating current (AC) input from a utility, other source, etc., and may output a direct current (DC) to the load 104. The battery 106 may be a backup battery (e.g., a part of a backup battery unit (BBU), etc.) configured to provide power to the load 104 in the event the rectifier is unable to provide sufficient power to the load. For example, if the rectifier 106 fails, the input to the rectifier fails, etc., the battery 106 may provide backup power to the load 104 to keep the load operating properly. The amount of power provided by the battery 106 may depend on the characteristics of the battery. Similarly, the length of time that the battery 106 can provide backup power may depend on the battery characteristics.

The rectifier 102 may be any suitable rectifier capable of providing an output voltage to the load. For example, the rectifier 102 may be an AC to DC rectifier configured to receive AC input from a utility and provide DC power to the load. The rectifier 102 may include a controller configured to control the output voltage of the rectifier at a set point.

The battery 106 may be any suitable battery capable of providing an output voltage to the load 104. For example, the battery 106 may be a backup battery in a backup battery unit configured to provide backup power to the load 104 if the rectifier 102 is unable to provide sufficient power to the load (e.g., if the rectifier fails, power is lost at the input to the rectifier, the rectifier is extracted from the system, etc.). The battery 106 may include the controller 108 configured to control the output of the battery 106 (or the battery backup unit) at a set point. The battery 106 may have any suitable battery chemistry, and may be a lithium based battery. The battery 106 may be a rechargeable battery.

The load 104 may be any suitable load capable of receiving output power from the rectifier and/or battery. For example, in some embodiments, the load 104 may include computers, servers, data storage equipment, communications equipment, etc.

The controller 108 may any controller suitable for controlling an output voltage of the battery 106, and may be configured to control the output using any suitable techniques. For example, the controller 108 may be a microcontroller, microprocessor, integrated circuit, control circuit, etc. The controller 108 may be configured to control the output voltage of the battery 108 by sensing an output voltage of the battery, changing operation of the battery and/or a converter coupled to the output of the battery, executing computer-instructions designed to control battery output voltage, executing integrated circuit logic, etc.

A temperature sensor 105 may be coupled to the battery 106 and configured to monitor a temperature of the battery (e.g., an ambient temperature around the battery, an external temperature of the battery, an internal temperature of the battery, etc.). For example, the temperature sensor may 105 may be disposed in an ambient air surrounding the battery 106, the temperature sensor may be in contact with an exterior of the battery, the temperature sensor may be inside the battery, etc.

The temperature sensor 105 may be coupled to the controller 108, which may be configured to warm the battery 106 when the battery temperature reduces below a specified threshold. The specified threshold may be a minimum threshold based on a temperature at which the battery performance begins to degrade (e.g., discharge rate of the battery is reduced, discharge capacity of the battery is reduced, storage capacity of the battery is reduced, etc.). Example thresholds may include room temperature (e.g., about 21 degrees C., 70 degrees F.), freezing temperature (0 degrees C., 32 degrees F.), etc.

The battery 106 may be needed to provide a specified amount of power discharge to the load 104. The specified amount may depend on an amount of power needed by the load 104 in the event of a loss of power from the rectifier 102. If the rectifier 102 fails, the battery 106 may be needed to supply the specified amount of power. The specified amount of power may allow load equipment to operate during temporary power losses at the rectifier, may allow the load equipment to power down safely, may allow the load equipment to backup information before power is lost, etc. For example, the specified amount of power may be about 3000 W for about ninety seconds. The battery 106 may be coupled to a same DC bus as the rectifier 102, with the load 104 also connected to the DC bus. The battery 106 may be, for example, needed to sustain an output voltage of the DC bus above a specified threshold needed by loads coupled to the DC bus.

The battery 106 may be configured to output a signal (e.g., a DC OK signal, a ready signal, etc.) when it is capable of providing the specified amount of power. The ready signal may be based on the temperature of the battery 106. For example, when the battery temperature is below a specified threshold, no signal may be output/sent, thereby indicating the battery is too cold to provide a desired amount of output power. Once the temperature of the battery 106 is at or above the minimum threshold, the ready signal will be output, indicating the battery is capable of providing the specified amount of power.

In order to warm the battery, the controller is configured to raise the output voltage of the battery 106 above the output voltage of the rectifier 102. The output voltage of the battery 106 may be raised while the output voltage of the rectifier 102 remains constant, while the rectifier 102 is providing power to the load, etc. This may cause current to flow out from the battery 106 and to the load 104. The battery 106 may have an internal resistance, and the current flowing out of the battery may heat up the internal resistance (e.g., due to power loss of the current flowing through the internal resistance, etc.), thereby warming the battery. This approach to warming the battery 106 heats the battery from the inside, and may warm the battery faster than a heating element in contact with the outside of the battery, or heating the air surrounding the battery. In some embodiments, the internal warming of the battery may be combined with exterior heating elements, etc.

The controller 108 may be configured to keep the output voltage of the battery 106 below the output voltage of the rectifier 102 while the temperature of the battery is at or above the minimum threshold temperature. The controller 108 may keep the output voltage of the battery 106 at any suitable value below the rectifier 102 output voltage, sufficient to keep the battery from interfering with the operation of the rectifier. In some example embodiments the controller 108 may keep the output voltage of the battery 106 about 300 millivolts below the output voltage of the rectifier 102.

When the controller 108 raises the output voltage of the battery 106 above the output voltage of the rectifier 102 to warm the battery, the controller may raise the output voltage of the battery by any suitable amount sufficient to cause the battery to supply current to the load 104. In some example embodiments the controller 108 may raise the output voltage of the battery 106 above the output voltage above of the rectifier by an amount in the range of about 100 millivolts to about 200 millivolts. Other embodiments may raise the output voltage of the battery by other suitable voltage amounts over the output voltage of the rectifier, including more than 200 millivolts, less than 100 millivolts, etc.

The controller 108 may be configured to raise the output voltage of the battery 106 only for a period of time (i.e., a pulse period). The pulse period of time may be any suitable period, and may be selected as an amount of time sufficient to at least partially warm the battery 106 via discharge of current through an internal resistance of the battery. The pulse period may also be selected to prevent excessive draining of battery capacity. The pulse period may be selected to prevent the battery discharge from interfering with operation of the rectifier 102 (e.g., to prevent the system from triggering an error if the battery 106 supplies current at a voltage level above the rectifier 102 for an extended period of time). For example, in some embodiments the pulse period may be in a range between about 0.5 seconds and about one second, between about two seconds and about five seconds, etc. Other embodiments may include longer or shorter pulse periods. After the pulse period, the controller 108 may be configured to lower the output voltage of the battery 106 back down to or below the output voltage of the rectifier 102.

The raising and lowering of the output voltage of the battery 106 may be considered as a cycle. The controller 108 may be configured to cycle the output voltage of the battery 106 by raising it above the output voltage of the rectifier 102, then lowering it back down to or below the output voltage of the rectifier 102. Each cycle may be considered as a current pulse, because during the raised portion of the cycle the battery will output current to the load 104.

The controller 108 may be configured to put the battery 106 through a series of multiple current pulses (or cycles) to warm the battery. Any suitable number of cycles may be used to warm the battery 106, and the number may be selected based on a number of cycles needed to sufficiently warm the battery without wasting excessive amounts of battery capacity. For example, in some embodiments the controller 108 may be configured to perform between 10 cycles and 20 cycles, approximately three cycles, etc.

Although example numbers of cycles and time periods for each cycle have been described herein, it should be understood that other time periods or amounts of cycles may be used without departing from the scope of the present disclosure. For example, in some embodiments the controller 108 may be configured to provide a constant current drain instead of current pulses, for a more extended period of time.

The number of cycles may be performed within a specified period of time (e.g., a cycle period). For example, the controller 108 may cycle the output voltage of the battery 106 above and below the output voltage of the rectifier 102 between ten and twenty times in less than one minute. Other embodiments may include shorter or longer cycle periods. Some embodiments may continue to cycle the output voltage of the battery until the battery is warmed above a minimum ready threshold.

In some embodiments, the controller 108 may cycle the output voltage of the battery 106 above and below the output voltage of the rectifier 102 according to a duty cycle. Any suitable duty cycle may be used, and the duty cycle may be short enough that the battery 106 will not be drained too much, while long enough to provide sufficient warming of the battery over time. For example, the output voltage of the battery 106 may be cycled at about a one percent duty cycle. Other embodiments may include longer or shorter duty cycles. The battery 106 may be cycled at a fixed duty cycle, a variable duty cycle, etc. The battery 106 may be cycled continuously until a temperature of the battery is over a minimum threshold, may be cycled only for a cycle period, etc.

The controller 108 may be configured to raise the output voltage of the battery 106 over the output voltage of the rectifier 102 anytime a temperature of the battery 106 is below a minimum threshold. In other embodiments, the controller 108 may be configured to raise the output voltage of the battery 106 only when the temperature is below the minimum threshold.

Additionally, the controller 108 may be configured to raise the output voltage of the battery 106 over the output voltage of the rectifier 102 while the battery is not fully charged. Put another way, the controller 108 may not wait until the battery 106 is fully charged to start warming the battery. This may be advantageous because the battery 106 can be warmed sooner, and may not have to wait until it is fully charged to start warming. This can allow the battery 106 to reach a ready temperature threshold and be ready to provide sufficient power to the load sooner, as compared to waiting longer for the battery to reach a full charge state before warming.

Raising the voltage of the battery 106 before it is fully charged can drain the battery to a level where it does not have sufficient charge to provide a specified amount of power. Accordingly, in some embodiments the controller 108 may monitor a reserve capacity of the battery 106 and may only raise the output voltage of the battery above the output voltage of the rectifier 102 when there is sufficient reserve capacity in the battery to provide current to the load 104 to warm the battery.

The controller 108 may provide cycling of the output voltage of the battery 106 based on a combination of temperature thresholds and capacity thresholds. For example, the controller 108 may begin cycling when the battery temperature is below a minimum temperature threshold and the battery capacity is above a minimum capacity threshold (which may be less than a full capacity). The cycling may be continued until the battery temperature reaches the minimum temperature threshold or the battery capacity reduces to the minimum capacity threshold. Multiple thresholds may be used for both temperature and capacity, may be used in combination, used individually, may be used with hysteresis to avoid repetitive on/off of the cycling, etc. Additionally, a temperature threshold may be adjusted based on a current capacity value, a capacity threshold may be adjusted based on a current temperature threshold, etc.

Figure 2:
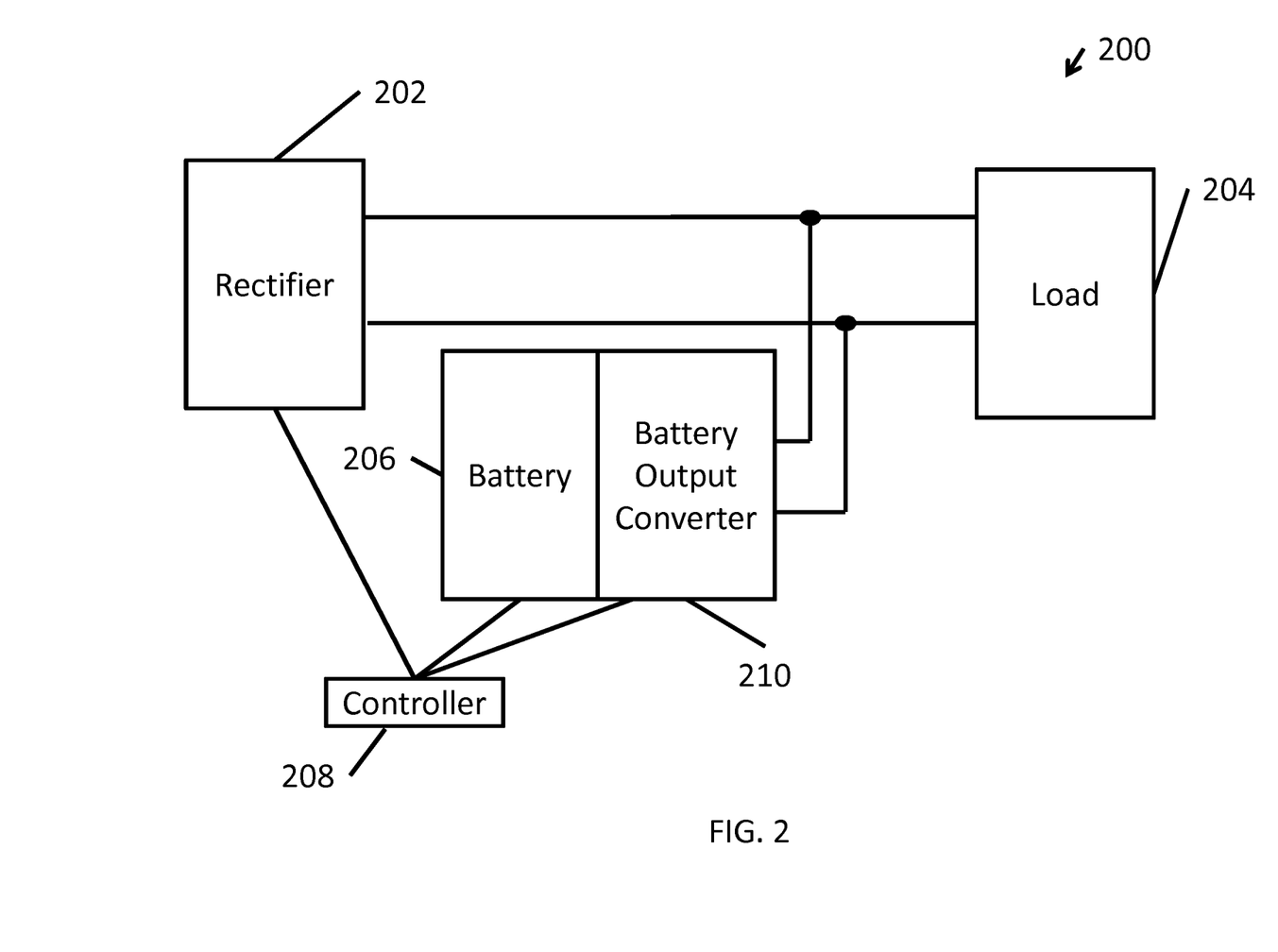
FIG. 2 is a block diagram of the system of FIG. 1, including a battery output converter.

FIG. 2 illustrates another example system 200, which is similar to the system 100 of FIG. 1 but includes a battery output converter 210 coupled to the battery 206. The battery 206 may be an electronic battery (e.g., a battery having a controller, one or more output converters, etc.). The converter 210 is on the output side of the battery 206 and can regulate the output voltage of the battery. The converter 210 may be controlled by the controller 208, may include its own controller, etc.

As shown in FIG. 2, the controller 208 controls both the battery 206 and the rectifier 202. Accordingly, the controller 208 may be able to control any suitable combination of the rectifier 202, the battery 208, the battery output converter 210, etc. Some embodiments may include more than one controller, and each controller may be configured to control one or more of the elements of the system 200.

Rectifier 202 may be substantially similar to rectifier 102 of FIG. 1, and load 204 may be substantially similar to load 104 of FIG. 1.

Example systems may include one or more rectifiers 102, one or more batteries 106, one or more battery backup units, one or more loads 104, one or more controllers 108, any other power distribution system components, etc.

Figure 3:
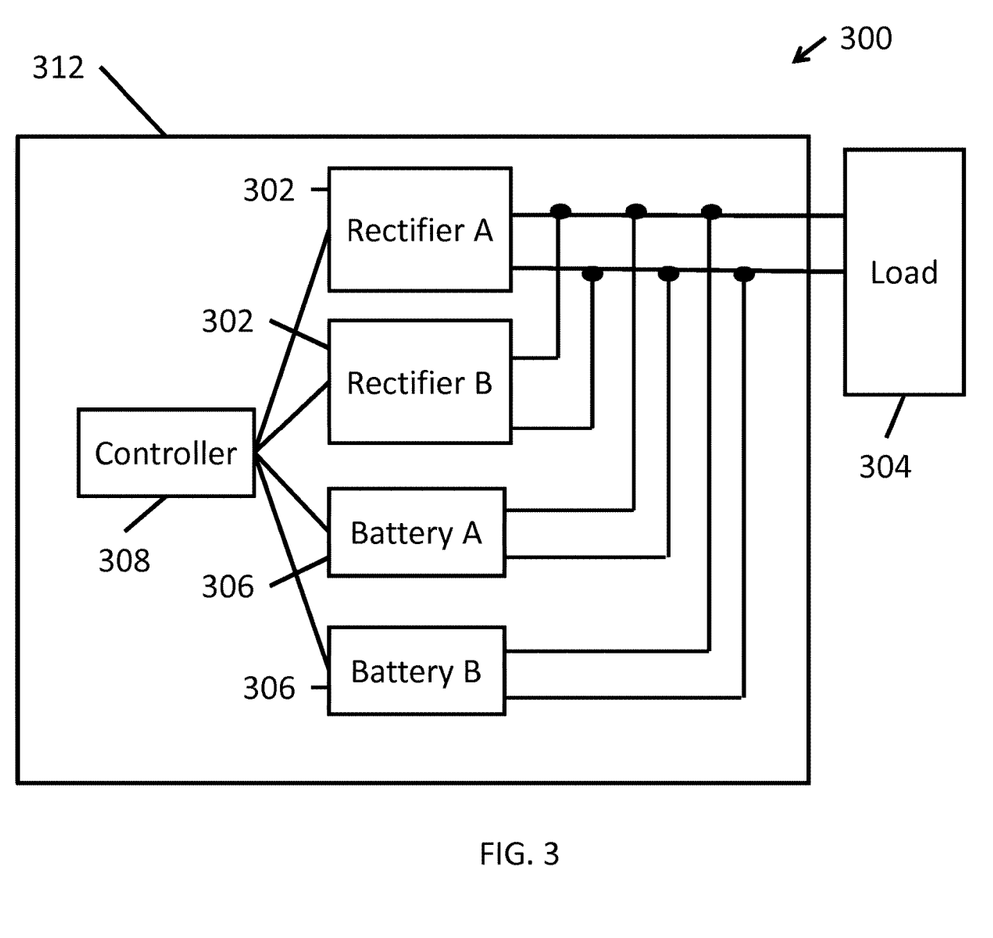
FIG. 3 is a block diagram of another example system for warming batteries including a shelf having multiple rectifiers and multiple batteries.

For example, FIG. 3 illustrates a shelf 312 having two rectifiers 302 (Rectifier A and Rectifier B), and two batteries 306 (Battery A and Battery B). The shelf 312 may be any suitable shelf for housing one or more rectifiers 302 and/or one or more batteries 306 for providing power to a load 304. For example, the shelf may be a cabinet, rack, etc. The rectifiers 302 and/or the batteries 306 may be partially enclosed by the shelf 312, fully enclosed by the shelf, etc. The shelf 312 may also include other suitable equipment (e.g., converters, controllers, etc.) which may be used in connection with the rectifiers and batteries, coupled to the rectifiers and batteries, separate from the rectifiers and batteries, etc. In some example embodiments, the system 300 may be a 12 volt DC power system for a data rack, a 48 volt system, etc.

In one embodiment, the shelf 312 may include a combined total of nine batteries 306 and rectifiers 302. For example, the batteries 306 and rectifiers 302 may be interchangeable in nine storage slots of the shelf 312.

As shown in FIG. 3, the controller 308 may be coupled to all rectifiers 302 and batteries 306. In other embodiments there may be more than one controller 308 and each controller may be coupled to one or more of the rectifiers 302 and batteries 306.

The batteries 306 may be warmed all together, warmed individually, warmed in different groups, etc. For example, if all batteries 306 are subjected to the same cold soak and cooled to approximately the same temperature, the controller may raise the output voltage of all batteries 306 together above the output voltage of the rectifiers 302, such that all batteries discharge current to the load 304 to warm each of the batteries. In some embodiments, each battery 306 may have its output voltage raised separately, so that each battery is warmed individually.

Figure 4:
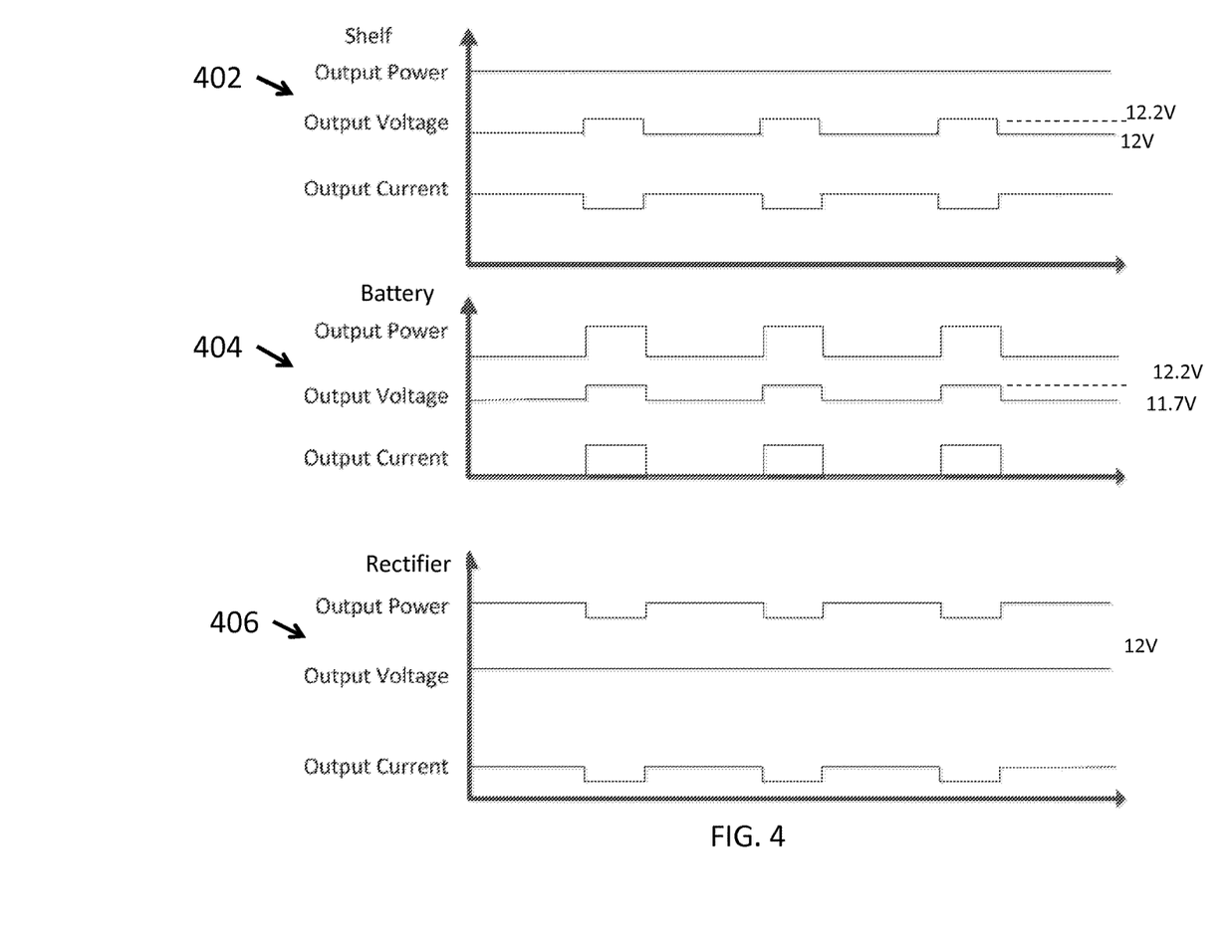
FIG. 4 is a diagram illustrating example waveforms of a shelf, battery, and rectifier.

FIG. 4 illustrates example waveforms of components on a shelf 402 (e.g., multiple rectifiers, batteries, loads, etc.), battery 404 and rectifier 406 as the output voltage of the battery is being cycled above and below the output voltage of the rectifier. For example, waveform 404 illustrates three pulses of raising the output voltage of the battery (e.g., raising the output voltage of the battery from 11.7 volts to 12.2 volts during each pulse, etc.). During those periods, the output current from the battery increases because the current is flowing from the battery to the load while the output voltage of the battery is increased above the output voltage of the rectifier. For example, the battery might have an output current of zero amps while the battery output voltage is below the rectifier output voltage. This increase in output current of the battery warms the battery via, for example, an internal resistance of the battery. As explained above, the increased output voltage and current of the battery produces a corresponding increase in the output power of the battery.

As shown in waveform 406, the output voltage of the rectifier remains constant (e.g., about 12 volts, etc.) while the output voltage of the battery is raised above it. This causes a drop in output current from the rectifier because the current to the load is being replaced by the output current from the battery during the pulses where the battery output voltage is increased. The decrease in output current from the rectifier causes a corresponding reduction in output power of the rectifier.

As shown in waveform 402, the output power of the shelf remains constant to the load during the pulses of battery current. However, the increase in battery output voltage during the pulses causes an increase in output voltage of the shelf, so the output current of the shelf decreases during the pulses to keep the power to the load constant. For example, the shelf may have an output voltage similar to the output voltage of the rectifier (e.g., about 12 volts, etc.) while the battery output voltage is lower, then the output voltage of the shelf may increase similar to the output voltage of the battery during the battery pulses (e.g., about 12.2 volts, etc.).

The output voltage values of FIG. 4 are for purposes of illustration only, and other embodiments may use different voltages (e.g., 48 volts, etc.).

According to another example embodiment of the present disclosure, a method of warming a battery in a power system is disclosed. The system includes one or more rectifiers configured to provide an output voltage to a load. The battery is coupled to the load and configured to provide an output voltage to the load. The method includes determining a temperature of the battery and, when the temperature of the battery is below a minimum temperature threshold, raising the output voltage of the battery above the output voltage of the one or more rectifiers so that current flows from the battery, thereby warming the battery via an internal resistance of the battery.

The method may include raising the output voltage of the battery above the output voltage of the rectifier(s) for a specified pulse period, and cycling the output voltage of the battery multiple times during a specified cycle time period. The method may also include cycling the output voltage of the battery above the output voltage of the rectifier(s) at a fixed or variable duty cycle, raising the output voltage of the battery above the output voltage of the rectifier(s) while the battery is not fully charged, etc.

Each of the example embodiments and aspects of the present disclosure may provide one or more of the following advantages: faster warming of a battery after a cold soak, faster warming of the battery by warming the battery from the inside, bringing the battery to a ready state sooner such that the battery is capable of providing a specified amount of power sooner, preventing excessive battery capacity drain through use of a limited number of pulses, preventing interference with normal operation of the rectifier, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for warming at least one battery, the system comprising:
    one or more rectifiers each having an input for receiving an input voltage and an output configured to provide an output voltage to a load;
    at least one battery having an input for receiving an input voltage to charge the battery, the battery coupled to the load and configured to provide an output voltage to the load; and
    a controller coupled to the battery and configured to raise the output voltage of the battery above the output voltage of the one or more rectifiers so that current flows from the battery, thereby generating heat inside the battery to warm the battery.

2. The system of claim 1, wherein the controller is configured to raise the output voltage of the at least one battery above the output voltage of the rectifier(s) for a specified period of time.

3. The system of claim 2, wherein the specified period of time is in a range between 0.5 seconds and 1 second.

4. The system of claim 1, wherein the controller is configured to cycle the output voltage of the at least one battery, each cycle including raising the output voltage of the at least one battery above the output voltage of the rectifier(s) and lowering the output voltage of the battery below the output voltage of the rectifier(s).

5. The system of claim 1, wherein the controller is configured to cycle the output voltage of the at least one battery multiple times during a specified cycling period.

6. The system of claim 5, wherein the controller is configured to cycle the output voltage of the at least one battery in a range between 10 cycles and 20 cycles.

7. The system of claim 5, wherein the specified cycling period is less than or equal to one minute.

8. The system of claim 4, wherein the controller is configured to cycle the output voltage of the at least one battery multiple times at a one percent duty cycle.

9. The system of claim 1, wherein the controller is configured to raise the output voltage of the at least one battery above the output voltage of the rectifier(s) by a specified value.

10. The system of claim 9, wherein the specified value has a range between 100 millivolts and 200 millivolts.

11. The system of claim 1, wherein the controller is configured to raise the output voltage of the at least one battery above the output voltage of the rectifier(s) when a temperature of the at least one battery is less than a defined temperature threshold.

12. The system of claim 1, wherein the controller is configured to raise the output voltage of the at least one battery above the output voltage of the rectifier(s) while the output voltage of the rectifier(s) remains constant.

13. The system of claim 1, wherein the controller is configured to raise the output voltage of the at least one battery above the output voltage of the rectifier(s) while the battery is not fully charged.

14. The system of claim 1, wherein the at least one battery is a backup battery configured to provide power to the load when the rectifier(s) is unable to provide sufficient power to the load.

15. The system of claim 1, wherein the at least one battery includes an internal resistance, the internal resistance thereby warming the battery as current flows through the internal resistance while being supplied from the battery to the load when the output voltage of the battery is above the output voltage of the rectifier(s).

16. The system of claim 1, further comprising a converter coupled to an output of the at least one battery, the controller configured to raise the output voltage of the battery above the output voltage of the rectifier(s) by changing a set point of the converter.

17. A method of warming a battery in a power system, the power system including one or more rectifiers configured to provide an output voltage to a load, the battery coupled to the load and configured to provide an output voltage to the load, the method comprising:
    determining a temperature of the battery; and
    when the temperature of the battery is below a defined temperature threshold, raising the output voltage of the battery above the output voltage of the one or more rectifiers so that current flows from the battery, thereby warming the battery via an internal resistance of the battery.

18. The method of claim 17, wherein raising the output voltage of the battery includes:
    raising the output voltage of the battery above the output voltage of the rectifier(s) for a specified period of time and lowering the output voltage of the battery below the output voltage of the rectifier(s) to define a cycle having a pulse period; and
    cycling the output voltage of the battery multiple times during a specified cycling period.

19. The method of claim 17, wherein raising the output voltage of the battery includes cycling the output voltage of the battery above the output voltage of the rectifier(s) at a one percent duty cycle.

20. The method of claim 17, wherein raising the output voltage of the battery includes raising the output voltage of the battery above the output voltage of the rectifier(s) while the battery is not fully charged.

* * * * *